UNITED STATES PATENT OFFICE.

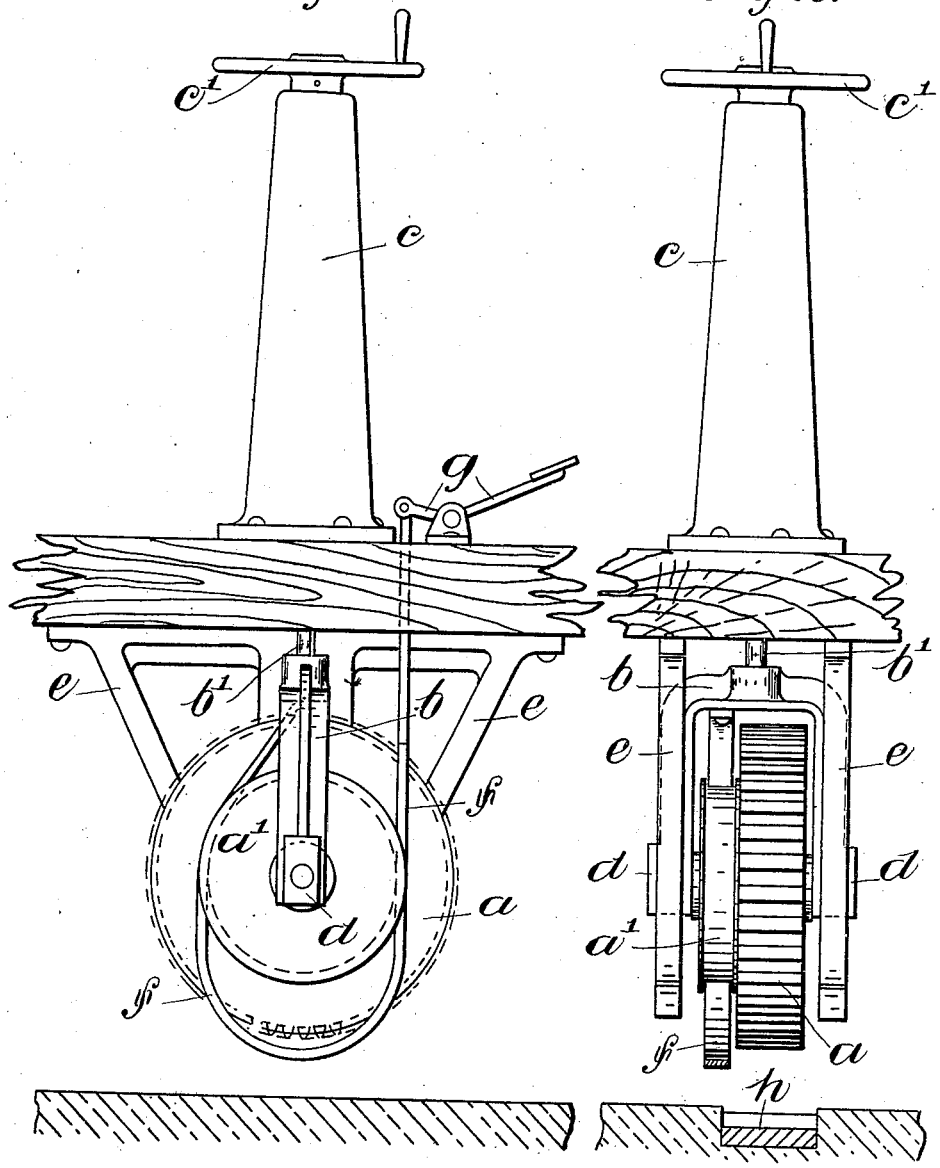

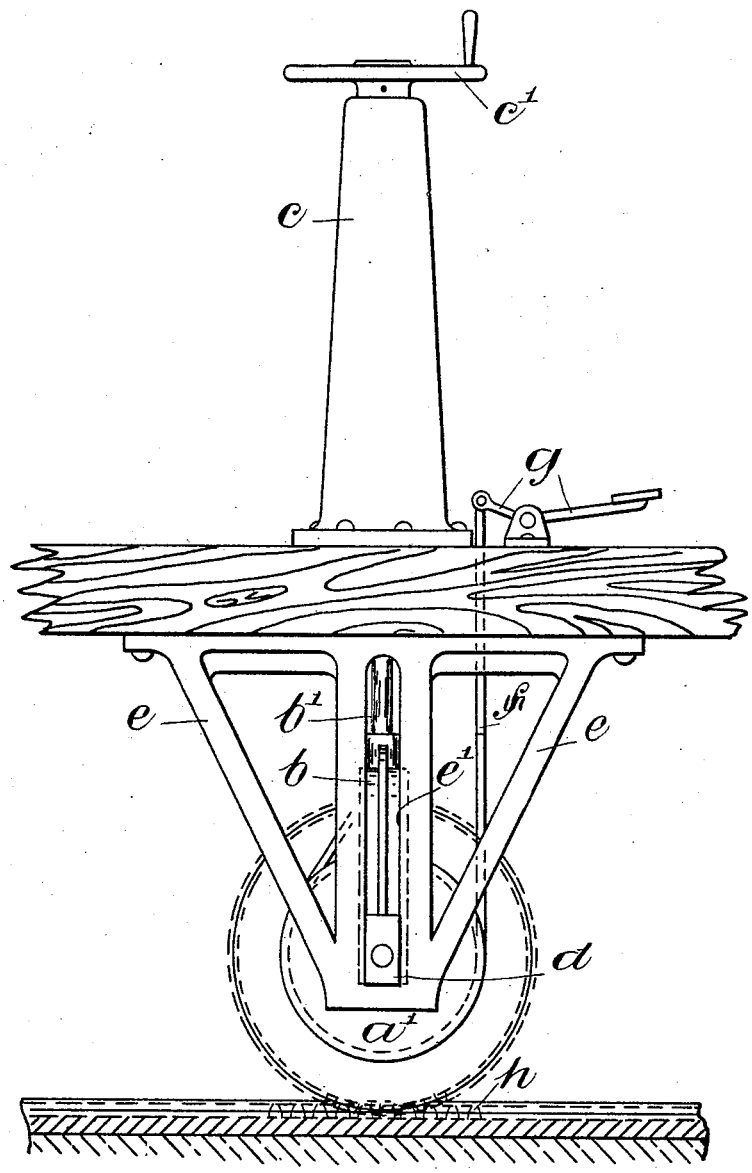

WILLIAM LOCKETT, OF SUTTON, ENGLAND.

BRAKING APPARATUS.

No. 863,193.　　　Specification of Letters Patent.　　　Patented Aug. 13, 1907.

Application filed March 13, 1907. Serial No. 362,220.

*To all whom it may concern:*

Be it known that I, WILLIAM LOCKETT, residing at Colonna, Manor Park Road, Sutton, Surrey, England, have invented certain new and useful Improvements in Braking Apparatus; and I do hereby declare the following to be a full, clear, and exact description of the invention, such as will enable others skilled in the art to which it appertains to make and use the same.

This invention relates to a new or improved method of and means for applying braking power to tramcars and the like, and refers particularly to a form of brake suitable for use when the car or the like is traversing a decline, the object being to provide extremely simple and effective means whereby the impetus of a car or the like may be checked or retarded without risk of the danger caused by wheels locking or brake blocks slipping.

This invention consists essentially in providing a toothed wheel beneath the car or the like, so mounted as to be capable of rising and falling out of or into engagement with a suitable rack laid between the running track or rails, means being provided whereby suitable braking power may be applied to the said toothed wheel.

In order that this invention may be fully understood, it will now be described with reference to the accompanying drawings, in which:—

Figure 1 is a side elevation of a device constructed according to this invention with one of the bearings of the toothed wheel removed for clearness, and the toothed wheel in its normal or inoperative position, Fig. 2 is an end elevation thereof, with the rack in cross section, and Fig. 3 is a side elevation of the device with the toothed wheel in engagement with the rack, the latter being shown in longitudinal section.

As shown in the drawings, the device comprises, a toothed wheel $a$ carried in an inverted U-shaped frame $b$ carried by the lower extremity of a rod $b'$ entering a suitable screw jack $c$ by means of which the frame $b$ and wheel $a$ are raised or lowered as required.

The frame $b$ is provided with guide blocks $d$ entering slots $e'$ in side stays or bearings $e$ which guide the frame $b$ in its travel.

The wheel $a$ is provided with a drum $a'$ formed integrally with or secured thereto, and around this drum passes a brake strap $f$, secured at one extremity to the frame $b$ and at the opposite extremity to one arm of a pivoted foot pedal $g$, the band $f$ being sufficiently slack when the wheel $a$ is in its normal or raised position as shown in Fig. 1, to allow the wheel $a$ to be lowered into contact with the rack $h$ before the strap $f$ is brought into operation upon the drum $a'$.

In practice, upon a decline being reached, the wheel $a$ is lowered into contact and meshes with the rack $h$, by means of the wheel or handle $c'$ of the screw jack $c$, braking power then being applied to the drum $a'$ through the strap $f$ by means of the pedal $g$, and the wheel $a$ is raised out of contact or engagement as soon as the decline has been descended.

It is obvious that the construction of this device may be varied considerably without departing from the spirit of this invention, for instance, the method of bringing the wheel $a$ into and out of engagement with the rack $h$, and the manner of applying braking power, which for example, may be accomplished, if desired, by means of a brake block screwing or otherwise brought to bear upon the drum $a'$.

Having now described my invention, what I claim as new and desire to secure by Letters Patent, is:—

1. In a brake, the combination, with stationary guides on the car, and a stationary toothed-rack on the track; of a bracket slidable in the said guides, a toothed-wheel and a brake-wheel secured together and journaled in the said bracket, means for sliding the said bracket to place the said toothed-wheel into and out of engagement with the said rack, a brake-strap having one end secured to the said slidable bracket and passing under the said brake-wheel, and an operating lever carried by the car and connected to the other end of the said brake-strap.

2. The new or improved apparatus for applying braking power to tramcars and the like, comprising a toothed wheel such as $a$, a brake drum such as $a'$, a frame such as $b$ carried by a rod such as $b'$, a screw jack such as $c$, guide blocks such as $d$ carried by the frame $b$, engaging guides $e'$ in stays or bearings such as $e$, a brake strap such as $f$ and foot pedal such as $g$ and rack such as $h$; all combined, arranged and operating, substantially as described and shown with reference to the accompanying drawings, and for the purposes specified.

In testimony whereof I affix my signature, in presence of two witnesses.

WILLIAM LOCKETT.

Witnesses:
GODFREY B. SHEPHERD,
CLAUDE A. SAGGEN.